Patented Oct. 20, 1953

2,656,338

UNITED STATES PATENT OFFICE 2,656,338

COPOLYMERS OF BUTENE-1 DERIVATIVES

Marion R. Lytton, West Chester, Pa., assignor, by mesne assignments, to The Chemstrand Corporation, Decatur, Ala., a corporation of Delaware No Drawing. Application March 13, 1950, Serial No. 149,439

21 Claims. (Cl. 260—85.5)

This invention relates to a new class of inherently dye-receptive polymeric materials, compositions and shaped articles comprising the polymers, and to methods for producing them.

The new polymeric materials are copolymers of certain butene-1 derivatives with at least one other different $CH_2=C<$-containing compound which is copolymerizable with the butene-1 derivatives.

The butene-1 derivatives embraced within the scope of the invention are addition products obtained by the reaction of butadiene monoxide with certain secondary amines, as well as certain salts, esters, and salts of the esters of the addition products.

The addition products may be obtained by mixing a selected secondary amine, in solution or in the gaseous phase, with butadiene monoxide (3,4-epoxybutene-1) preferably at a temperature between 25 and 90° C., and separating the reaction product from the crude reaction mixture by distillation. The reaction involves opening of the oxide ring of the butadiene monoxide and addition of the elements of the secondary amine to the structure.

Organic and inorganic acid salts of the addition products may be obtained by mixing the addition product with a controlled stoichiometric amount of the organic acid or its anhydride, or of the inorganic acid. The appropriate organic acids are those of the aliphatic series from formic acid to and including lauric acid, or corresponding anhydrides in the case of acids other than formic acid. Suitable inorganic acids are hydrochloric, sulfuric, etc.

The acid salt of the acyl ester is obtained by reacting the addition product with one mole of an organic acid or acid anhydride whereby the ester and organic acid salt are formed in one step. The ester may be liberated from the acid salt by neutralization, for example, by treating the salt with sodium carbonate.

The secondary amines which may be reacted with the butadiene monoxide to obtain the addition products are the dialkylated amines including dimethylamine, diethylamine, dipropylamine, di-isopropylamine, dibutylamine, di-isobutylamine, di-secondary butylamine, and dimyricylamine, diarylamines such as diphenylamine, and heterocyclic secondary amines in which the hydrogenated ring is fully saturated, such as morpholine, piperidine, ethyleneimine, and pyrrolidine.

The butene-1 derivatives are represented by the general formula

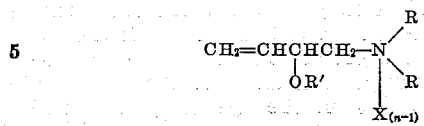

where each R represents an aryl radical or an alkyl radical and when R is alkyl, the two radicals may be joined through C, O, or N to form a saturated cyclic radical attached to the nitrogen of the butene-1 derivative, R' is hydrogen or an acyl radical containing from one to 12 carbons, $n$ is an integer from 1 to 2, and when $n$ is 2, X represents an organic or inorganic acid. These butene-1 derivatives are shown and claimed in my copending application Serial No. 149,438, filed March 13, 1950, and entitled "Quaternary Salts of Butene-1 Derivatives."

Examples of other $CH_2=C<$-containing compounds which may be copolymerized with the butene-1 derivatives to produce useful inherently dye-receptive copolymers include acrylonitrile, acids such as acrylic, haloacrylic and methacrylic acids, esters such as methyl methacrylate, butyl, octyl, methoxymethyl, and chlorethyl methacrylate and the corresponding esters of acrylic and α-chloracrylic acids; methacrylonitrile, vinyl and vinylidene halides such as vinyl chloride, vinyl fluoride, vinylidene chloride, vinylidene fluoride, 1-fluoro-1-chlorethylene; vinyl carboxylates such as vinyl acetate, vinyl chloracetate, vinyl propionate, and vinyl stearate; N-vinyl-imides such as N-vinylphthalimide and N-vinyl succinimide; N-vinyl lactams such as N-vinylcaprolactam and N-vinyl butyrolactam; vinyl aryl compounds such as styrene and vinyl naphthalene; and other compounds such as methyl vinyl ketone, chlortrifluorethylene, methyl fumarate, methyl vinyl sulfone, methyl vinyl sulfoxide, methyl vinyl sulfide, fumaronitrile, maleic anhydride, and vinyl trichlorsilane or its hydrolysis product.

The new copolymers may be synthesized from mixtures of the monomers in any desired proportions from 99–1 percent of one to 1–99 percent by weight of the other, by any of the known polymerization procedures including mass or bulk polymerization, and polymerization in aqueous suspension or emulsion in the presence of a dispersing or emulsifying agent, the suspension or emulsion being maintained by any agitation method, for example by tumbling in a rotating reactor, or through the use of any suitable rotary stirring device. A wide variety of emulsifying agents may be used. In general, any composition having both hydrophilic and hydrophobic radicals may be used, and the expression "emulsifying agent" is intended to include commercial soaps made by the saponification of animal and vegetable oils, such as sodium stearate, potassium laurate, ammonium oleate, and mixtures of these and other salts as they occur in commercially available "soaps." Other emulsifying agents are the rosin soaps, the salts of sulfonated hydrocarbons, dialkyl sodium sulfosuccinates, the salts of partial esters of sulfuric acid and high molecular weight alcohols, quaternary ammonium salts such as stearyl dimethyl benzyl ammonium chloride, non-ionic emulsifiers, such as ethylene oxide condensates of hexitan (e. g. sorbitan or mannitan) monostearates, fatty acids, mercaptans, alcohols, and hexitan monostearates.

The copolymerization may be effected by heating the monomers to 30 to 100° C. in the presence of a catalyst, and may be performed at alkaline or acid pH. However, the pH at which the copolymerization is performed affects the molecular weight of the polymer and, in some instances, also has an effect on the dye-acceptance and solubility of the copolymer. For example, copolymers of the butene-1 derivatives with acrylonitrile produced at alkaline pH have been found to have comparatively poor affinity for the acid dye-stuffs, whereas a copolymer of the same monomers produced at pH between 2 and 5 has pronounced affinity for the acid dyes. The molecular weights of the copolymers are also dependent on the pH, and the copolymers produced at a pH between 2 and 5 invariably have molecular weights which are substantially higher than the molecular weights of the copolymers formed under alkaline conditions, especially when the monomer other than the butene-1 derivative is aliphatic in character. Therefore, when high molecular weights and pronounced affinity for the acid dyestuffs are desirable, it is preferred to carry out the copolymerization at a pH of 2 to 5, which may be accomplished by the addition of acid or an acid-yielding salt to the polymerizing medium.

The copolymerization reaction may be catalyzed by means of any free radical-producing catalyst. Suitable catalyst include the water-soluble peroxy compounds, for example hydrogen peroxide, sodium peroxide, sodium perborate, sodium persulfate and other alkali metal salts of peroxy acids, or other water-soluble peroxy compounds. Azo catalysts, such as azo-2,2'-diisobutyronitrile may be used advantageously in the copolymerization. A wide variation in concentration of catalysts may be used depending on the temperature at which the copolymerization is conducted, the concentration of the monomers in the reaction mass, and the molecular weight desired in the ultimate product. From 0.1 to five percent by weight of catalyst may be used. In general, it is desirable to have a uniform reaction rate and therefore a substantially uniform concentration of the catalyst is desired throughout the reaction. An approximation of these conditions may be obtained by separately preparing the aqueous solution and adding the solution in increments periodically throughout the reaction. Or the solution of the catalyst may be added continuously to the mass.

The copolymers of the invention may be produced, also, by redox polymerization in which the copolymerization is conducted at low temperature in the presence of a peroxy type catalyst and a reducing agent which forms a reduction-oxidation system ("redox" system) with the peroxy compounds which accelerate the copolymerization.

The new copolymers may also be produced by a special solution polymerization in which the solvent is saturated with a calculated mixture of the monomers. The catalyst, or a portion thereof is added and the copolymerization conducted just at a reflux temperature by continuously adding a mixture of the monomers in predetermined proportion to the mass at such a rate as to keep the reflux temperature substantially constant. In this manner, the desired uniform concentration of each monomer is maintained in the reactor and the products are substantially homogeneous with respect to both composition and molecular weight. The catalyst, in solution, may be added to the mass continuously at a controlled rate to maintain the catalyst concentration constant throughout the reaction.

The copolymerizaion may be conducted in the presence of molecular weight regulators which act as chain terminators and prevent the formation of very large molecular weight increments. Such regulators are exemplified in the high molecular weight aliphatic mercaptans, such as dodecyl mercaptan, and in carbon tetrachloride and dithioglycidol.

The copolymers of the invention may contain from 1 to 99%, preferably from 1 to 50% by weight of the butene-1 derivative in the molecule. The copolymers are variously suitable for the production of synthetic fibers, films and shaped articles generally, as coating compositions, and so on. In a specifically preferred embodiment, the copolymer comprises from 1 to 20% of the butene-1 derivative, from 80 to 99% of acrylonitrile, and when the butene-1 derivative and acrylonitrile total less than 100% of the copolymer, from 1 to 19% of another monoethylenically unsaturated copolymerizable substance, for example, methacrylonitrile, styrene, beta-dimethyl-aminoethyl methacrylate, etc.

The new copolymers are soluble in a wide variety of solvents, depending on the composition of the copolymer. Those copolymers containing from 1 to 20% of the butene-1 derivative and from 80 to 99% of acrylonitrile, and including ternary polymers containing from 1 to 19% of a third component, are soluble in such solvents as dimethylacetamide and dimethylformamide. Such copolymers are capable of fabrication into compositions and articles suitable for various purposes. However, they are particularly adapted to the preparation of valuable dye-receptive synthetic fibers by extrusion of a solution thereof into an evaporative medium or into a non-solvent for the polymer.

The evaporative medium used in dry spinning filaments or yarns from solutions of the new copolymers may comprise any gaseous medium which is inert to the copolymer, such as air, nitrogen, steam, etc., or any mixture of such inert media.

The non-solvent which may be used in wet-spinning or wet-casting the solution of the new polymers may be a mixture of water and the spinning solvent, glycerin, or any appropriate liquid which is an extractive for the spinning or casting solvent and a non-solvent for the copolymer.

Further details of the practice of the invention are set forth in the following examples in which the parts are given by weight.

*Example I*

Five hundred and sixty parts of butadiene monoxide (3,4-epoxybutene-1) were added to 1530 parts of a 25% aqueous dimethylamine solution at a rate such that, with rapid stirring and external cooling, the temperature rose to 45–60° C. That temperature was maintained throughout the addition.

The mixture was stirred for 30 minutes, and then heated to slow refluxing for 30 minutes. It was allowed to stand at room temperature for about 12 hours. Solid potassium carbonate was then added, and the aqueous layer which separated was discarded. This drying procedure was repeated twice more, the aqueous layers being discarded. The nearly anhydrous reaction product was dried for about 12 hours over solid potassium carbonate from which it was filtered, and finally distilled. Yield: 510 parts (50%). The product, 3-hydroxy-4-dimethylaminobutene-1, boils at 48° C. at 14 mm.; $n_D^{23}$=1.4482. Carbon, theory=62.68%, found=62.71%; hydrogen, theory=11.30%, found=11.20%; nitrogen, theory=12.17%, found=11.89%.

Seven hundred parts of water, 4.5 parts (8%) of the 3-hydroxy-4-dimethylamino-butene-1, 52.5 parts of acrylonitrile and 4 parts of 17 N sulfuric acid (pH of the mixture, 1.9) were heated to reflux (76° C.). Three parts of potassium persulfate in 50 parts of water were added and the reflux temperature was permitted to rise to 82° C. The addition of a monomer mixture consisting of 8.7 parts of the 3-hydroxy-4-dimethylamino-butene-1 and 100 parts of acrylonitrile was begun and continued at a rate such that the reflux temperature remained substantially constant at 82° C. Simultaneously, the addition of 13.5 parts of dilute sulfuric acid (made by adding sufficient water to 4.2 parts of 17 N sulfuric acid to bring the total amount to 13.5 parts) was begun and continued at a rate equal to one-tenth the rate at which the mixed monomers were added (pH of the mass 2.2). The additions were complete in 36 minutes. The mixture was heated for an additional 15 minutes, after which the copolymer was filtered and washed with water. Yield: 136 parts or 82%. The copolymer had a specific viscosity of 0.16 at 0.1% concentration in dimethylformamide. By nitrogen analysis, it was found to contain about 4.5% of 3-hydroxy-4-dimethylamino-butene-1 and about 95.5% acrylonitrile.

*Example II*

A sample of the copolymer of Example I was intimately mixed with dimethylacetamide to give an 18% solution of the copolymer. The solution was extruded through a spinneret having 40 orifices, each 0.0045 inch in diameter into a bath consisting of water and 70% of dimethylacetamide by volume. The fibers were withdrawn, washed, dried, and stretched 300% at 140° C. in superheated steam.

A standardized dyeing procedure was developed utilizing an aqueous bath containing 2% of the acid dyestuff Wool Fast Scarlet G. Supra and 15% of 96% sulfuric acid, based on the weight of the sample to be dyed. The fibers were entered into the bath at room temperature, and the bath was brought to the boil in 10 minutes and boiled for 90 minutes. The fibers were dyed to a good red color in this bath, whereas polyacrylonitrile fibers do not take up a perceptible amount of dye under the same conditions.

*Example III*

Seven hundred parts of water, 9.0 parts (16%) of 3-hydroxy-4-dimethylamino-butene-1, 48 parts of acrylonitrile, and 6.5 parts of 16.8 N sulfuric acid (pH of the mixture=2.1) were heated to reflux at 78° C. Three parts of potassium persulfate in 50 parts of water were added, and the reflux temperature was allowed to rise to 82° C. A mixture consisting of 17.4 parts (16%) of 3-hydroxy-4-dimethylamino-butene-1 and 91.3 parts of acrylonitrile was added continuously at a rate controlled to maintain the reflux temperature at 82° C. Simultaneously, 15.3 parts of a 1:1 mixture of 16.8 N sulfuric acid and water were added at a rate equal to one-tenth the rate at which the monomer mixture was added (pH of the mass, 4.2). The additions were complete in 10 minutes, and the mass was heated for an additional 10 minutes, after which the copolymer was filtered and washed with water. Yield 117 parts, or 71%. The copolymer had a specific viscosity of 0.13 at 0.1% concentration in dimethylformamide. By nitrogen analysis it was found to contain about 6.3% of 3-hydroxy-4-dimethylamino-butene-1 and about 93.7% of acrylonitrile.

Films and fibers formed from this copolymer were dyed a good red shade by the procedure described in Example II.

*Example IV*

Seven hundred parts of water, 26.4 parts (35.5%) of 3-hydroxy-4-dimethylamino-butene-1, 48 parts of acrylonitrile, and 15 parts of 16.8 N sulfuric acid (pH of mixture=2.0) were heated to reflux (78° C.). Three parts of potassium persulfate in 50 parts of water were added, and the reflux temperature was permitted to rise to 82° C. The continuous addition of 100 parts of acrylonitrile was then begun at a rate controlled to maintain the temperature at 82° C. The pH of the mass at this stage was 2.1. The addition required 45 minutes, and the mass was then heated for an additional 10 minutes after which the copolymer was separated by filtration, and washed. Yield, 130 parts or 70%. The copolymer had a specific viscosity of 0.16 at 0.1% concentration in dimethylformamide. By nitrogen analysis, it was found to contain between 10 and 13% of 3-hydroxy-4-dimethylamino-butene-1 and between 87 and 90% of acrylonitrile.

Yarns and films formed from this copolymer were dyed to a very good shade of red by the procedure of Example II.

*Example V*

Example IV was repeated except that during the addition of the 100 parts of acrylonitrile, there were added, continuously and at a rate equal to one-tenth the rate of addition of the acrylonitrile, 13.5 parts of 16.8 N sulfuric acid, to give a pH of 4.3. Yield, 124 parts or 71%. The copolymer had a specific viscosity of 0.16 at 0.1% concentration in dimethylformamide. It was found to contain about 9.7% of 3-hydroxy-4-dimethylamino-butene 1, by nitrogen analysis.

*Example VI*

Example IV was repeated except that the copolymerization was carried out at a pH of 6.

Yarns and films formed from solutions of the copolymers of Examples V and VI were dyed to a good red shade by the procedure of Example II.

Example VII

One hundred and thirty parts of morpholine, 105 parts of butadiene monoxide, and 27 parts of water were mixed in a vessel, whereupon an exothermic reaction took place with elevation of the temperature to 70° C. After this reaction had subsided, water was stripped off and the mixture was distilled under reduced pressure. Yield of 3-hydroxy - 4 - morpholino-butene-1, 193 parts (82%), B. P. 83–84° C. at 1 mm., $n_D^{24}=1.4818$.

Theory: C=61.15; H=9.55; N=8.28.
Found: C=61.37; H=9.43; N=8.97.

A mixture of 300 parts of water, 21 parts of acrylonitrile, and 2.86 parts of the 3-hydroxy-4-morpholino-butene-1 were titrated with 16.8 N sulfuric acid to a pH of 4. 1.5 parts of potassium sulfate were added, and the mixture was heated to 70–90° C. for two hours on the steambath.

19.6 parts or 82% of a copolymer having a specific viscosity of 0.17 at 0.1% concentration in dimethylformamide, and containing, by nitrogen analysis, 9% of 3-hydroxy-4-N-morpholino-butene-1 were obtained.

Fibers of the copolymer were dyed to a good red shade as in Example II.

Example VIII

To a solution of 258 parts of di-n-butylamine in 774 parts of absolute ethanol there were added, over a period of one hour, 140 parts of butadiene monoxide, with stirring, the temperature being maintained at 50–60° C. with slight external heating. After all of the butadiene monoxide had been added, the mixture was refluxed for one hour. The bulk of the ethanol was then recovered by distillation at atmospheric pressure and the residue was distilled under reduced pressure. Yield of 3-hydroxy-4-di-n-butylamino-butene-1, 275 parts (69%); $n_D^{22.5}=1.4478$.

Theory: C=72.4%; H=12.56%; N=7.04%.
Found: C=72.32%; H=12.24%; N=6.75%.

Twenty-one parts of acrylonitrile and 2.86 parts of the 3-hydroxy-4-di-n-butylamino-butene-1 were copolymerized as in Example VII. 20.5 parts (86%) of a copolymer having a specific viscosity of 0.13 at 0.1% concentration in dimethylformamide, and containing, by nitrogen analysis, about 88% of acrylonitrile, were obtained.

Fibers of this copolymer were dyed to an excellent red shade by the procedure of Example II.

Example IX

To 128 parts of piperidine in 27 parts of water, there were added, dropwise, 105 parts of butadiene monoxide, with stirring at a rate to maintain the temperature at 90° C. The mixture was then refluxed for two hours, cooled, and the water separated off and discarded. The organic layer was dried over solid calcium sulfate. The dried product was distilled at reduced pressure. Yield of 3-hydroxy-4-piperidino-butene-1, 194 parts (83%); B. P. 89–92° C. at 10 mm.; $n_D^{24}=1.4770$.

Theory: C=69.68; H=10.97; N=9.03.
Found: C=69.58; H=10.74; N=9.35.

Twenty-one parts of acrylonitrile and 2.86 parts of the 3-hydroxy-4-piperidino-butene-1 were copolymerized as in Example VII. 18.6 parts or 78% of a copolymer having a specific viscosity of 0.16 at 0.1% concentration in dimethylformamide, and containing about 9% of 3-hydroxy-4-piperidino-butene-1 and about 91% acrylonitrile were obtained.

Fibers and films of this copolymer were dyed to a good red shade by the procedure of Example II.

Example X

Fourteen hundred parts of water, 105 parts of acrylonitrile and 9.1 parts (8%) of 3-hydroxy-4-dimethylamino-butene-1 were heated to reflux. One-third part of a solution of three parts of potassium persulfate in 100 parts of water was added, and polymerization set in. The addition of a monomer mixture of 200 parts of acrylonitrile and 17.4 parts of 3-hydroxy-4-dimethylamino-butene-1 was then begun and the reflux temperature was maintained at 71–73° C. by controlling the rate at which the mixture of co-monomers was added. The remaining catalyst solution was added in three portions during the addition of the monomers. All of the monomer mixture was added in one hour. An additional 2.25 parts of potassium persulfate in 75 parts of water were added over 45 minutes, the temperature being maintained between 71 and 75° C.

The copolymer was filtered, and washed with water; yield 213.5 parts. It contains about 97% acrylonitrile and about 3% of 3-hydroxy-4-dimethylamino-butene-1, by nitrogen analysis.

This copolymer was prepared at a pH of about 9 and had a lower molecular weight than the copolymer produced at pH between 2 and 5. (The specific viscosity of the copolymer at 0.1% concentration in dimethylformamide was 0.16.) A film cast from a dimethylacetamide solution of this copolymer was dyed to a fairly good red shade as in Example II.

Example XI

Fourteen hundred parts of water, 54 parts of acrylonitrile and 7.4 parts of the acetyl ester of 3 - hydroxy - 4 - dimethylamino-butene-1 were heated to reflux. 3% of potassium persulfate in water was added and polymerization set in. The addition of a mixture of 200 parts of acrylonitrile and 27.3 parts of the ester was begun and the reflux temperature was maintained at 83° C. by controlling the rate of addition of the monomer mix. When the addition was complete, the reaction mixture was heated an additional 15 minutes.

The copolymer was filtered and washed with water. Yield, 202 parts. It contained about 97.6% acrylonitrile and 2.4% of the acetyl ester. This copolymer, prepared at a pH of about 9, is less soluble in dimethylacetamide and dimethylformamide than a similar copolymer prepared at a pH of 2 to 5.

Films and fibers formed from dimethylformamide solutions of the copolymer were dyed to a light red color in a dyebath as in Example II.

Example XII 1400 parts of water, 105 parts of acrylonitrile, and 14.3 parts of 3-hydroxy-4-di-n-butylamino-butene-1 (produced as in Example VIII) were heated to reflux. One-third part of a solution of three parts of potassium persulfate in 100 parts of water was added and polymerization set in. The continuous addition of a mixture of 200 parts of acrylonitrile and 27.3 parts of the 3-hydroxy-4-di-n-butylamino-butene-1 was commenced, and the reflux temperature was maintained at 73° C. by controlling the rate of addition of the monomer mixture. A second third of the catalyst solution was added after 30 minutes. The remaining third was added 30 minutes later. The polymerization time was 1 hour and 25 minutes.

The copolymer was filtered and washed. Yield 140.5 parts (40%). This copolymer, prepared at a pH of about 9, had a much lower molecular weight than the copolymer of Example VIII (the specific viscosity at 0.1% concentration in dimethylformamide was 0.12), and films cast from a dimethylacetamide solution were dyed to only a very light red shade by the procedure of Example II.

*Example XIII*

Nitrogen was bubbled through a mixture of 26.4 parts of acrylonitrile, 3.6 parts of the 3-hydroxy-4-dimethylamino-butene-1 of Example I for 20 minutes, with stirring. A solution of 0.2 part of potassium persulfate in 50 parts of water was added and was followed by the addition of a solution of 0.3 part of sodium meta-bisulfite in 50 parts of water. The mixture was stirred and nitrogen was bubbled through it for three hours. The temperature which was 25° C. at the start, rose to 30° C. during the first hour and then gradually declined.

The copolymer yield was 10.3 parts or 34%. Films cast from a dimethylacetamide solution of the copolymer are dyed to a fairly good red shade by the procedure of Example II.

*Example XIV*

To 725 parts of water there were added 26.4 parts of 3-hydroxy-4-diethyl-amino-butene-1 and 48.0 parts of acrylonitrile; this solution was brought to a pH of 2 by the addition of 50% aqueous sulfuric acid, after which 3.0 parts of potassium persulfate dissolved in 25 parts of water were added. The mixture was brought to reflux at 77° C. with stirring and 100 parts of acrylonitrile were added over a period of 35 minutes, at such a rate as to keep the reflux rate substantially constant at 80° C. The mixture was heated an additional 10 minutes without refluxing and the copolymer separated by filtration. Yield: 120 parts. The copolymer had a specific viscosity of 0.19 at 0.1% concentration in dimethylformamide. It contained 4.9% of 3-hydroxy-4-diethyl-aminobutene-1 as determined by nitrogen analyses.

A 17% spinning solution of the copolymer in dimethylacetamide was prepared. It was spun into a 68% aqueous dimethylacetamide bath using a 40-hole, 0.0045" spinneret. The fibers were stretched 300% in steam under pressure at 140° C. These fibers dyed to an acceptable red shade in the dyebath of Example II.

*Example XV*

To 1000 parts of water there were added 3.5 parts of 3-hydroxy-4-dimethylamino-butene-1 and 40 parts of methacrylonitrile. The solution was brought to a pH of 4 by the addition of an aqueous sulfuric acid solution containing one part of the acid to one part of water. The mixture was brought to reflux at 77° C. Two parts of potassium persulfate were added, and the mixture was heated for five hours at 77 to 85° C. A small quantity of hydrochloric acid was added to coagulate the copolymer, which was dried, ground, washed thoroughly with water and dried. The copolymer had a specific viscosity of 0.087 at 0.1% concentration in dimethylformamide. By nitrogen analysis it was found to contain about 3.5% of 3-hydroxy-4-dimethylamino-butene-1. Films cast from a dimethylacetamide solution of the copolymer were dyed to a light pink shade by the procedure of Example II.

Quaternary salts of the copolymers of this invention may be produced by dissolving the copolymer in a suitable spinning or casting solvent, and adding a quaternizing agent to the solution whereby the quaternary salt is formed in solution. These solutions of the quaternized copolymers can be spun, cast, or otherwise shaped directly, to produce dye-receptive fibers, films, and other shaped articles.

The invention is defined by the following claims.

I claim:

1. A copolymer containing, in the polymer molecule, from 1 to 20 percent of 3-hydroxy-4-dimethylamino-butene-1, and from 80 to 99 percent of acrylonitrile.

2. A copolymer containing, in the polymer molecule, from 1 to 20 percent of 3-acyl-4-dimethylamino-butene-1, and from 80 to 99 percent of acrylonitrile.

3. A copolymer containing, in the polymer molecule, about 2 percent of 3-acetyl-4-dimethylamino-butene-1 and about 98 percent of acrylonitrile.

4. A copolymer containing, in the polymer molecule, from about 3 to 8 percent of 3-hydroxy-4-dimethylamino-butene-1, and from about 92 to 97 percent of acrylonitrile.

5. A copolymer containing, in the polymer molecule, from 1 to 20 percent of 3-hydroxy-4-di-n-butylamino-butene-1, and from 80 to 99 percent of acrylonitrile.

6. A copolymer containing, in the polymer molecule, about 12 percent of 3-hydroxy-4-di-n-butylamino-butene-1, and about 88 percent of acrylonitrile.

7. A copolymer containing, in the polymer molecule, from 1 to 20 percent of 3-hydroxy-4-piperidino-butene-1, and from 80 to 99 percent of acrylonitrile.

8. A copolymer containing, in the polymer molecule, about 10 percent of 3-hydroxy-4-piperidino-butene-1, and about 90 percent of acrylonitrile.

9. A copolymer containing, in the polymer molecule, from 1 to 20 percent of 3-hydroxy-4-morpholino-butene-1, and from 80 to 99 percent of acrylonitrile.

10. A copolymer containing, in the polymer molecule, about 10 percent of 3-hydroxy-4-morpholino-butene-1, and about 90 percent of acrylonitrile.

11. The method of claim 20, wherein the monomers are acrylonitrile and 3-hydroxy-4-dimethylamino-butene-1.

12. The method of claim 20, wherein the monomers are acrylonitrile and 3-hydroxy-4-di-n-butylamino-butene-1.

13. The method of claim 20, wherein the monomers are acrylonitrile and 3-hydroxy-4-morpholino-butene-1.

14. The method of claim 20, wherein the monomers are acrylonitrile and 3-hydroxy-4-piperidino-butene-1.

15. The method of claim 20, wherein the monomers are acrylonitrile and 3-acyl-4-dimethylamino-butene-1.

16. The method of claim 20, wherein the monomers are acrylonitrile and 3-acetyl-4-dimethylamino-butene-1.

17. A copolymer containing, in the polymer molecule, (a) a butene-1 derivative of the formula

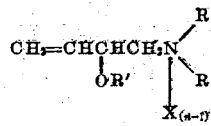

wherein R' is a substituent taken from the group consisting of hydrogen and acyl radicals containing from 1 to 12 carbons, each R represents a substituent taken from the group consisting of lower alkyl and aryl radicals and when R is alkyl, the two R's may be joined through an atom selected from the group consisting of C, N, and O atoms to form a saturated cyclic radical, $n$ is an integer from 1 to 2, and when $n$ is 2, X represents an acid selected from the group consisting of inorganic acids and organic acids containing from 1 to 12 carbons, with (b) at least one other monomer containing a single $CH_2=C<$ group and which is a polymerizable with the butene-1 derivative, the butene-1 derivative being present, by weight, in an amount equal to from 1 to 99 percent of the total weight of the copolymer.

18. A copolymer containing, in the polymer molecule, from 1 to 20 percent of (a) a butene-1 derivative of the formula

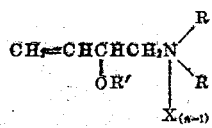

wherein R' is a substituent taken from the group consisting of hydrogen and acyl radicals containing from 1 to 12 carbons, each R represents a substituent taken from the group consisting of lower alkyl and aryl radicals and when R is alkyl, the two R's may be joined through an atom selected from the group consisting of C, N, and O atoms to form a saturated cyclic radical, $n$ is an integer from 1 to 2, and when $n$ is 2, X represents an acid selected from the group consisting of inorganic acids and organic acids containing from 1 to 12 carbons, and (b) from 80 to 99 percent of acrylonitrile and, when (a) and (b) total less than 100 percent of the copolymer, (c) from 1 to 19 percent of another monoethylenically unsaturated polymerizable substance.

19. Shaped articles of a copolymer containing, in the polymer molecule, (a) from 80 to 99 percent of acrylonitrile and (b) from 1 to 20 percent of a butene-1 derivative of the formula

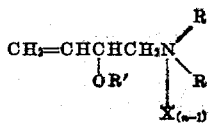

wherein R' is a substituent taken from the group consisting of hydrogen and acyl radicals containing from 1 to 12 carbons, each R represents a substituent taken from the group consisting of lower alkyl and aryl radicals and when R is alkyl, the two R's may be joined through an atom selected from the group consisting of C, N, and O atoms to form a saturated cyclic radical, $n$ is an integer from 1 to 2, and when $n$ is 2, X represents an acid selected from the group consisting of inorganic acids and organic acids containing from 1 to 12 carbons.

20. The process for preparing a copolymer of (a) a butene-1 derivative having the formula

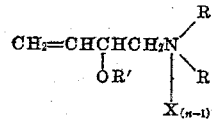

wherein R' is a substituent taken from the group consisting of hydrogen and acyl radicals containing from 1 to 12 carbons, each R represents a substituent taken from the group consisting of lower alkyl and aryl radicals and when R is alkyl, the two R's may be joined through an atom selected from the group consisting of C, N, and O atoms to form a saturated cyclic radical, $n$ is an integer from 1 to 2, and when $n$ is 2, X represents an acid selected from the group consisting of inorganic acids and organic acids containing from 1 to 12 carbons, and (b) at least one other monomer containing a single $CH_2=C<$ group which is copolymerizable with the butene-1 derivative, which process comprises heating a mixture of (a) and (b) wherein the butene-1 derivative is present, by weight, in an amount equal to from 1 to 99 percent of the total weight of the mixture, and in the presence of a polymerization catalyst for the mixture of copolymerizable materials.

21. A process as in claim 20, wherein the monomer (b) is acrylonitrile and the polymerization is performed in an aqueous medium, in the presence of a water-soluble polymerization catalyst, and at a pH of 2 to 5.

MARION R. LYTTON.

References Cited in the file of this patent

UNITED STATES PATENTS

| Number | Name | Date |
|---|---|---|
| 2,451,420 | Watkins | Oct. 12, 1948 |
| 2,491,471 | Arnold | Dec. 20, 1949 |
| 2,497,926 | Bruson | Feb. 21, 1950 |
| 2,503,244 | Coover et al. | Apr. 11, 1950 |
| 2,504,082 | Neher et al. | Apr. 11, 1950 |